Nov. 19, 1963  J. MELILL ETAL  3,110,961
HONEYCOMB SANDWICH PANEL BRAZING

Filed April 6, 1959  5 Sheets-Sheet 1

INVENTORS
JOSEPH MELILL
RALPH A. HAPPE
SEARLE G. SMITHHART
CALVIN H. HALL
LEWIS W. MYERS
BY
ATTORNEY

Nov. 19, 1963

J. MELILL ETAL 3,110,961

HONEYCOMB SANDWICH PANEL BRAZING

Filed April 6, 1959

INVENTORS
JOSEPH MELILL
RALPH A. HAPPE
SEARLE G. SMITHHART
CALVIN H. HALL
LEWIS W. MYERS

BY

ATTORNEY

| | CONVENTIONAL | DIE-QUENCH |
|---|---|---|
| SIZE OF PANEL | 5' X 10' | 5' X 10' |
| CORE SIZE | $\frac{1}{4}$" CELL X $\frac{3}{4}$" HEIGHT | $\frac{1}{4}$" CELL X $\frac{3}{4}$" HEIGHT |
| CELL WALL THICKNESS | .0015" | .0015" |
| WEIGHT OF RETORTS REQUIRED | 7700 lbs. | 810 lbs. |
| FURNACE CAPACITY | 20,000,000 B.T.U./HOUR | 20,000,000 B.T.U./HOUR |
| FURNACE CYCLE FOR BRAZING | 16 HOURS | $\frac{1}{2}$ HOUR |
| VOLUME OF ARGON USED | 2640. CU. FT. | 26.40 CU. FT. |
| TIME FOR COOLING TO ROOM TEMP. | 8 HOURS | $\frac{1}{4}$ HOUR |

FIG. 7

Nov. 19, 1963  J. MELILL ETAL  3,110,961
HONEYCOMB SANDWICH PANEL BRAZING
Filed April 6, 1959  5 Sheets-Sheet 4

INVENTORS
JOSEPH MELILL
RALPH A. HAPPE
SEARLE G. SMITHHART
CALVIN H. HALL
LEWIS W. MYERS
BY
Arthur W. Fayak
ATTORNEY Nov. 19, 1963 J. MELILL ETAL 3,110,961
HONEYCOMB SANDWICH PANEL BRAZING
Filed April 6, 1959 5 Sheets-Sheet 5

INVENTORS
JOSEPH MELILL
RALPH A. HAPPE
SEARLE G. SMITHHART
CALVIN H. HALL
LEWIS W. MYERS
BY
ATTORNEY

United States Patent Office 3,110,961
Patented Nov. 19, 1963

3,110,961
HONEYCOMB SANDWICH PANEL BRAZING
Joseph Melill, Torrance, Ralph A. Happe, Garden Grove, Searle G. Smithhart, Long Beach, Calvin H. Hall, Los Angeles, and Lewis W. Myers, Gardena, Calif., assignors to North American Aviation, Inc.
Filed Apr. 6, 1959, Ser. No. 804,398
6 Claims. (Cl. 29—471.1)

This invention relates to the fabrication of honeycomb core sandwich panels and is more specifically concerned with securement of sandwich panel face sheets to a cellular core by a rapid braze method which obviates the necessity for use of massive precision tooling.

Honeycomb sandwich panels constructed of stainless steel, titanium or other high-strength, high-temperature and corrosion resistant metals have assumed increasing importance as materials of construction because of their high strength-weight ratios. Nevertheless, use of such panels has been severely restricted due to the excessive fabrication costs and the unreliability of currently known fabrication methods.

Exemplary of these conventional fabrication techniques is the sand-seal or double retort method. As shown in FIGURE 7, this method requires the use of an outer retort consisting of a bottom sheet having an annular upstanding trough containing sand and a cover member whose peripheral edge is embedded in the sand in order to seal the interior of the outer retort from the atmosphere. The sandwich panel to be brazed is placed on a precision-surface-machined graphite reference plane and enclosed within an inner retort which is sealed by seam or butt welding the adjoining edges of its base and cover members. A second graphite mass is rested upon the cover sheet. Tube connections are provided to the interiors of both the inner and outer retorts and an inert gas is continuously flowed through both retorts. The actual brazing cycle is accomplished by heating the complete assembly for a sufficient period of time to obtain brazing temperatures at the surfaces of contact between the sandwich panel surface or face sheets and the cellular core. The assembly is then removed from the source of heat and permitted to cool. A "running purge" of inert gas is used throughout the heating and cooling cycles.

While this and other conventional methods have been successfully employed to produce commercially acceptable brazed sandwich panels, the resulting panels do not sufficiently conform to the requirements of continuous bond, freedom from distortion, maintenance of the physical properties of the parent metal and cost economy to permit utilization as mass production techniques.

The double retort as well as other conventional methods require the utilization of extremely massive tooling, the surfaces of which have been precision machined to very close tolerances. The necessity for machining to precision tolerances devolves from the requirement that the sandwich panel face sheets be maintained in complete contact with the cellular core in order to obtain continuity of braze. The use of precision tooling in the practice of conventional methods is not only required during cooling cycles but also during heating cycles. This means that materials must be used which will have sufficient hot strength and low enough coefficients of thermal expansion to permit maintenance of their precision reference planes at brazing temperature. Graphite, although the most satisfactory material found for use to date, must, nevertheless, because of its brittleness, be used in massive quantities, thus substantially increasing the heat capacity requirements of the furnace used to achieve brazing temperatures, as well as the time of the brazing cycle.

The employment of massive tooling in conventional methods tends to cause reduction in the physical properties of the parent metal of the sandwich panel because of these increased heating and cooling times. For example, in fabricating a sandwich panel five feet by ten feet in size by use of the double retort, the time required for brazing in a furnace of economical heat capacity is approximately sixteen hours. Brazing temperatures for stainless steel sandwich panels are in the neighborhood of 1600° F. to 1800° F., and since such temperatures fall within the austenite region of the phase diagram for stainless steels, a slow cooling, such as indicated above, through the austenite-carbide region results in excessive formation of carbides, an attendant reduction in the carbon content of the austenite and premature transformation of the austenite. Consequently, a substantial decrease in ductility, strength and corrosion resistance properties occurs. Premature transformation may also result in warpage and hardening, making subsequent straightening operations difficult.

Oxidation of the internal metal surfaces of the panel during brazing will substantially diminish their wettability, thereby obviating formation of the required bond. It has been considered essential, for this reason, to accomplish the brazing operation in an inert gas atmosphere. Nevertheless, where an inert gas such as argon is used, impurities present in the gas will tend to be absorbed by the filler metal, thus impairing its ability to wet the metal surfaces which are to be joined. The extent of impurities absorbed by the filler metal, of course, depends upon the quantity of argon or other inert gas coming in contact with the brazing material. In existing methods, use of a continuous purge during the entire heating and cooling cycles substantially increases the quantity of impurities absorbed by the filler metal with a resulting diminishment in reliability.

A further and more important source of contamination of the filler metal is the graphite conventionally encased with the sandwich material in the internal retort in order to provide precision reference planes in direct contact with the panel face sheets. Although graphite itself possesses sufficient inertness, machinability and ability to withstand high temperatures without deformation to indicate its use as a reference plane in honeycomb brazing, it is characterized by an ability to absorb gases and other impurities which are "outgassed" when the graphite is subjected to high temperatures at partial vacuums. Even preliminary treatments of the graphite by heating under high vacuums prior to utilization as reference planes in the sand-seal method do not completely obviate outgassing to the extent necessary to insure freedom from contamination of the filler metal.

Another difficulty with respect to conventional brazing techniques resides in the necessity for providing brazed honeycomb sandwich panels with various face sheet attachments such as, for example T, U, and angle sections to permit securement of the sandwich panels to other structural components. To secure such attachments to honeycomb sandwich panels by conventional methods, complex, precision machined tooling, which closely conforms to the shape of the attachment, must be provided to position and securely hold the attachment and brazing alloy on the panel facing sheet during the brazing cycle. In the performance of these functions, the graphite tooling conventionally used must necessarily be placed in close adjacency to the attachment and to the brazing alloy associated therewith. Such close proximity of brazing alloy and graphite tooling substantially accentuates contamination of the brazing alloy. As already indicated, alloy contamination decreases the ability of the alloy to wet the metal surfaces which are to be joined and causes discontinuities in the brazed joint.

It is a further deficiency of conventional methods which utilize graphite tooling that panel heating and cooling are insufficiently uniform to avoid the development of thermal gradients. The result is nonuniform expansion or contraction of the metal and a consequent buckling, wrinkling or distortion of the panel and its elements. Gaps between the face sheets and the cellular core, so created, obviate continuity of bond. This problem becomes more and more serious as the size and complexity of the panel to be brazed increase. Heavy inserts, such as machined blocks of steel, which are intended to form an integral part of the final sandwich panel, require more heat to achieve brazing temperatures than do the surrounding cellular core areas with the result that the heavy sections thermally lag and cause distortion produced by temperature gradients. Furthermore, even if the panel is forcibly restrained against deflection during the cooling cycle, in avoidance of rupture of the brazed joint, nonuniformity of cooling may result in nonuniform locked in stresses in the panel which cause its distortion upon removal from the restraining platens.

It is, therefore, a principal object of our invention to provide a method for fabricating honeycomb sandwich panels which will effectively minimize the foregoing defects of conventional methods.

It is a more specific object of our invention to provide a method which utilizes a differential pressure concept for maintaining sandwich panel face sheets in contact with a cellular core and obviates the need for massive precision tooling. In our method, the differential pressure between the atmosphere and the interior of the retort urges the face sheets into the appropriate contacting relationship with the core during the brazing operation. Since this differential pressure acts continuously over the surfaces of the retort, the flexibility of the cover sheets permits such local deflection as is required in order to cause continuous abutment of the surfaces of joinder.

It is also a most important object of our invention to eliminate the necessity for employing massive tooling in conjunction with the sandwich panel during the heating cycle, thus reducing the time required for bringing the honeycomb sandwich panel to the required brazing temperature and consequently obtaining a substantial reduction in power requirements. We also desire to provide a honeycomb sandwich panel brazing method which will eliminate contamination resulting from graphite outgassing by obviating the necessity for employment of graphite reference planes within the inner retort.

It is an additional object of our invention to provide a honeycomb sandwich panel brazing method which will permit the rapid cooling of the brazed panel from the brazing temperature through the critical metal matrix phase transformation regions so as to avoid reduction in the desired physical properties of the metal.

It is another object of our invention to provide a honeycomb brazing method which will eliminate the necessity for employment of a running purge during the heating and cooling cycles, thereby effectuating a substantial economy in the use of an inert gas as a protective atmosphere during brazing and simultaneously accomplishing elimination, to a marked degree, of absorption of contaminants by the brazing or filler metal.

It is also a specific object of our invention to provide a method for closing off and sealing a steel purge tube in order to permit brazing with a static atmosphere without necessity for use of expensive and cumbersome valves.

A further object of our invention is to provide a method for securing face sheet attachments to honeycomb sandwich panels which obviates the need for expensive precision machined tooling and which eliminates contamination of brazing alloy in the area of the intended joint. We also desire to provide a sandwich panel construction in which attachment sections form an integral part of the face sheets thereof.

We also desire to provide a method which, through the use of copper glide sheets adjacent to the face sheets of the panel, effectively diminishes the existence of thermal gradiants throughout the honeycomb sandwich panel during its brazing cycle. It is also an object of our invention to provide an improved method for maintaining continuous contact between sandwich panel face sheets and the panel core by the transmission of a differential pressure through copper glide sheets to all points on the surfaces of the face sheets. It is still a further object of our invention to provide an improved method for brazing sandwich panel structures which permits the incorporation of metal inserts therein without leading to buckling, distortion or the formation of wrinkles.

These as well as further objects of our invention will become apparent from a consideration of the following description, as related to the drawings in which:

FIGURE 7 is a tabular comparison of the conventional double retort method and the method of our invention;

Figure 10:
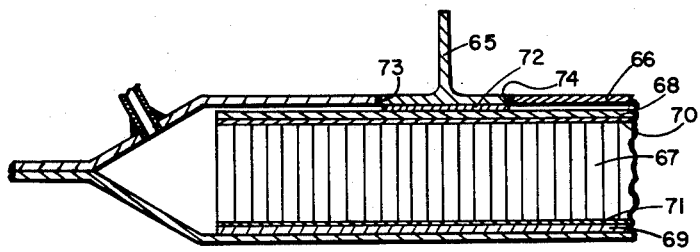
Figure 11:
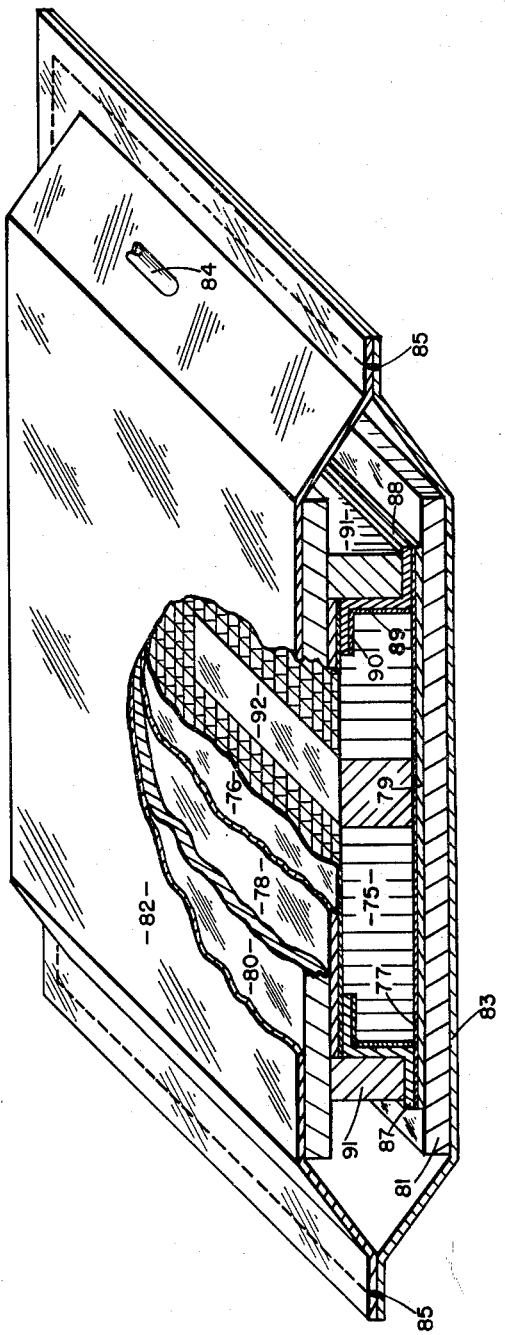

FIGURE 10 is a sectional view of an alternate embodiment of our inventon in which a sandwich panel attachment is secured to the cover sheet of an enveloping retort and a filler metal strip is provided between the attachment and the panel face sheet in the area of intended securement, and FIGURE 11 is a perspective view, partly in section and partly cutaway for purposes of clarity, illustrative of a further embodiment of our invention.

Figure 1:
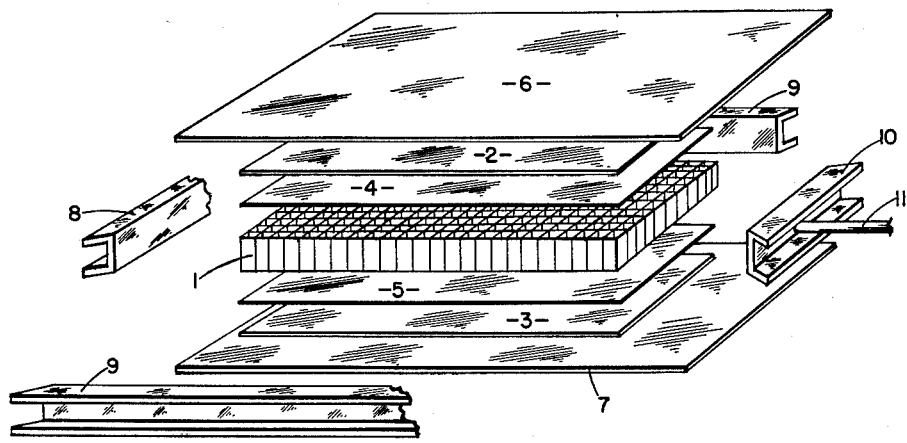
FIGURE 1 is an exploded perspective view of the honeycomb sandwich panel elements and the retort components required for accomplishment of brazing in accordance with our method.

The first step of our method requires assembly of the structural elements comprising the sandwich panel and the protective retort in the relationship illustrated in FIGURE 1. A conventionally fabricated honeycomb cellular core panel 1 is positioned between a pair of face sheets 2 and 3, which upon completion of the brazing operation will constitute the structural skins of the resulting panel. Intermediately disposed between the cellular core 1 and each of the face sheets 2 and 3 are a pair of brazing or filler metal sheets 4 and 5, which are of sufficient thickness to provide the required quantity of filler metal for formation of a complete bond between the cellular core and face sheets.

Exteriorly of the panel face sheets are positioned a pair of retort cover sheets 6 and 7. These sheets are of sufficiently greater size than the panel face sheets 2 and 3 to provide for an overlapping area which receives channel shaped end and side close-out members 8 and 9. As will be evident from a consideration of FIGURE 2, these close-out members define, with the cover sheets 6 and 7, a retort of sufficient size to completely enclose the honeycomb sandwich panel. One of the close-out members, 10, is provided with an opening into which a purge tube 11 extends. This tube is welded or otherwise sealingly secured to member 10.

Figure 2:
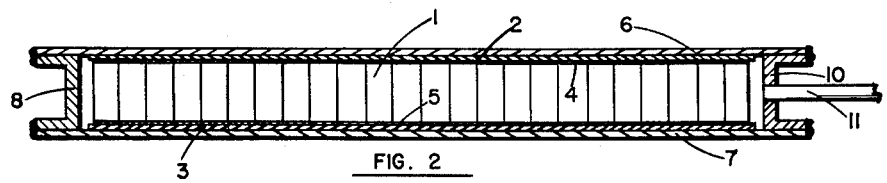
FIGURE 2 is a transverse sectional view of the complete sandwich panel and retort assembly of FIGURE 1.

It will be seen from FIGURE 2 that the close-out elements 8 and 9 are not substantially greater in depth than the thickness of the resulting honeycomb sandwich panel so that cover sheets 6 and 7 will constitute substantially flat reference planes throughout the area of contact with and beyond the edges of the honeycomb sandwich panel face sheets.

The surfaces of cover plates 6 and 7 which contact the honeycomb panel face sheets may be coated with a brazing stop-off compound in order to avoid any possibility of attachment of these cover plates to the face sheets.

Subsequent to the mechanical positioning of the panel and retort elements, the resulting assembly is clamped together and the peripheral edges of the cover sheets and close-out members sealingly secured together as by butt welding or seam welding the adjoining surfaces.

Figure 3:
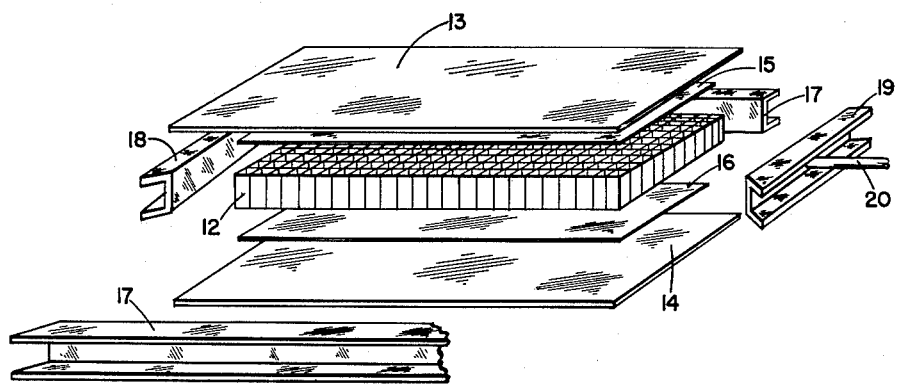
FIGURE 3 is an exploded perspective view of a modified form of retort capable of use in the practice of our method.
Figure 4:
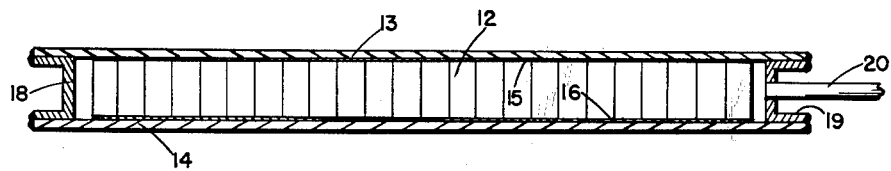
FIGURE 4 is a transverse sectional view of the retort of FIGURE 3.

An important modification of the method of our invention is illustrated in FIGURES 3 and 4. As is true in the above described embodiment, the honeycomb cellular core 12 is disposed intermediately between panel face sheets 13 and 14, and sheets of filler metal 15 and 16 are, of course, provided between the core and each of the face sheets. In this embodiment, it will be seen that panel face sheets 13 and 14 extend beyond the area of contact with the cellular core to furnish sufficient peripheral area externally thereof to receive the channel shaped side and end close-out members 17 and 18. As with close-out member 10 (FIGURES 1 and 2), the close-out member 19 has an aperture at which purge tube 20 is sealingly secured, as by welding, to the close-out member 19.

As more easily seen in FIGURE 4, the channel shaped close-out members are of substantially no greater depth than the thickness of the cellular core in order to insure mutual conformance to shape of the face sheets and core.

After assembly of the panel elements and close-out members, the retort is closed-off by sealingly securing the peripheral edges of the close-out members to the edges of the face sheets as by seam or butt welding.

Figure 5:
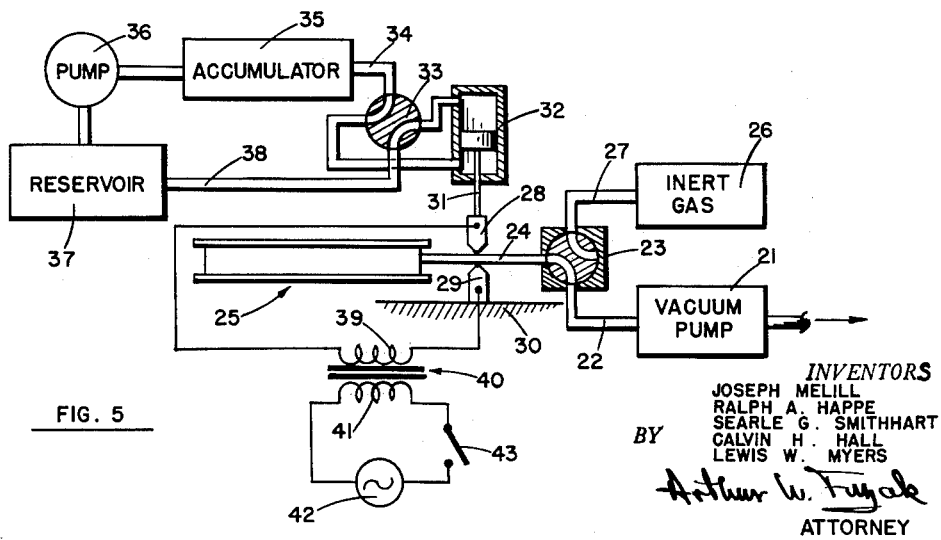
FIGURE 5 is a schematic illustration of a retort purge tube pinch-off apparatus used in obtaining a static atmosphere within the sandwich panel retort.

The subsequent steps of our process are the same for both of the foregoing embodiments except for the final removal of the brazed panel from the retort. As shown in FIGURE 5, the retort is evacuated and an inert gas atmosphere substituted for the originally present air, prior to closing out the purge tube.

Attainment of a static, insert gas atmosphere within the retort is accomplished by a cyclical drain and fill technique. The retort is first evacuated to a gage pressure of 29 inches of mercury, after which an inert gas, such as argon, is admitted to the retort until the internal gage pressure reaches 2 inches of mercury. This cycle is repeated as many times as is necessary to insure that all air and moisture are removed from the retort and the inert gas substituted therefor. It is generally desirable to repeat this cycle at least five times, and preferably approximately seven times or more, in order to obviate any possibility of retention of oxidizing gases or moisture in the retort.

In evacuating the retort, care must be exerted not to cause imposition of differential pressures in excess of the compressive strength of the cellular core. Thus, in accomplishing the brazing of a cellular core, constructed of a precipitation hardenable stainless steel such as 17–7PH which is $3/16$ of an inch in cell size and .001 of an inch in wall thickness, the maximum vacuum which can be tolerated at temperatures above 800° F. is approximately 6 inches of mercury gage. This vacuum corresponds to a vacuum gage reading of 23.8 inches of mercury at 68° F. When fabricating a panel constructed of $3/16$ inch by .001 inch PH steel core, the vacuum internally of the retort should, therefore, not be reduced to less than 23.8 inches of mercury, gage, prior to purge tube pinch-off. Although it is desirable to maintain the internal pressure as low as is consistent with the compressive strengths of the cellular core, we have obtained satisfactory braze results using differential pressures as low as ½ an inch of mercury, where additional tooling was not used externally of the retort surfaces during the heating cycle.

In FIGURE 5 is diagrammatically illustrated the apparatus employed to accomplish purging and purge tube seal-off. Vacuum pump 21 is connected through conduit 22 and through valve 23 to the purge tube 24 of retort 25. After the internal pressure of the retort is reduced to the desired level, the two-way valve 23 is turned to permit introduction of an inert gas from the source 26 through conduit 27, valve 23 and into the retort through the purge tube 24. As noted above, this cycle is repeated until the retort has an atmosphere consisting substantially exclusively of the inert gas. Thereafter, the purge tube is sealed off in the manner described below and cut off outside the sealed section in order to permit easy handling of the retort.

In the fabrication of steel or titanium honeycomb sandwich panels, or panels which are constructed of other high temperature materials, it is essential to employ steel close-out members and a steel purge tube in order to obviate the failure of these elements when the retort is subjected to high temperatures. The fact that it has been essential to use steel purge tubes in the fabrication of high strength metal honeycomb sandwich panels has heretofore discouraged efforts to use static atmospheres in brazing such panels because of the absence of known or expeditious methods which are effective to seal off the urge tube in such manner as to insure retention of an inert atmosphere within the retort. The method of the present invention employs the utilization of resistance welding electrodes, 28 and 29, which are adapted to transmit a compressive load just under the cold yield strength of the metal of a tube inserted therebetween.

Electrode 29 is securely affixed to an appropriate base member 30 in order to maintain its rigidity upon transmission of axial loads thereto. Opposed electrode 28 is rigidly secured to the drive rod 31 of hydraulic actuating cylinder 32. Fluid is admitted to cylinder 32 by valve 33 through conduit 34 from accumulator 35 which is supplied by pump 36, and is returned to storage tank 37 by conduit 38.

The opposed electrodes 28 and 29 are connected across a secondary coil 39 of transformer 40. Primary coil 41 is circuited to an A.C. source 42 through switch 43.

Purge tube pinch-off is accomplished by placing the purge tube 24 between opposed electrodes 28 and 29 and applying a locally compressive force diametrically thereto. The compressive force utilized is less than the cold yield strength of the metal while being greater than the yield strength but less than the ultimate strength of the metal at a temperature of not less than 1700° F. Subsequently, the tube is heated to a temperature of not less than 1700° F. by inducing a resistance current flow therethrough. We have found that for a ¼ inch diameter by .040 inch wall thickness tube, constructed of a 321 steel, the nominal composition of which is .08% C, 18.0% Cr, 9.5% Ni, 2.0% Mn, .8% Si, and .8% Ti, the application of 152 pounds of compressive force across the tube and the subsequent maintenance of 2000 amperes of current, where the secondary voltage is approximately 3.5 volts, for a period of time sufficient to obtain at least 15 but not more than 60 cycles of current flow through the tube will accomplish completely satisfactory purge tube seal-off. It will, however, be apparent that other current flows, voltages and compressive loads may be utilized so long as the limitations indicated above with respect to yield and ultimate tensile strengths as well as temperatures are observed.

In the event that an inconveniently long purge tube has been employed in the acquisition of a static, inert gas atmosphere within the retort, the purge tube can be cut just outside of its sealed portion. It will be noted that after either of the embodiments illustrated in FIGURES 1 and 3 is treated in accordance with the foregoing manipulative steps, the resulting cellular core enclosed retorts comprise articles of manufacture which can be marketed as such.

Figure 6:
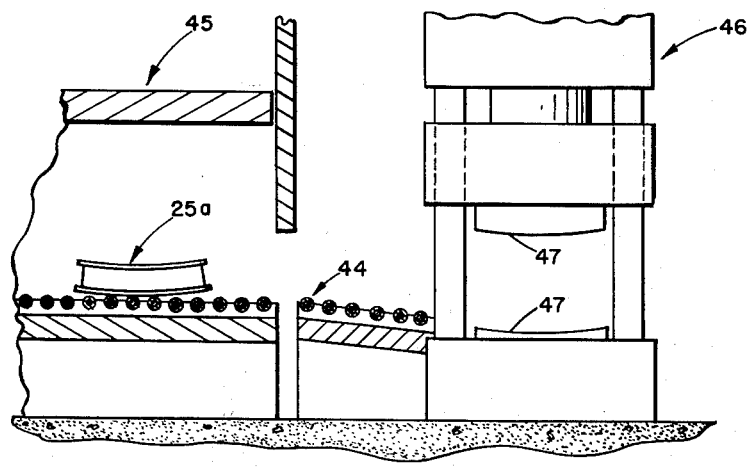
FIGURE 6 is a diagrammatic view of a furnace and press arrangement which may be utilized in practicing our method.

The actual heating and cooling steps of our method may be performed in the manner diagrammatically illustrated in FIGURE 6. In this illustration, the honeycomb core enclosed retort 25a is placed upon a plurality of rollers 44, or other transfer and support means, which extend from within a furnace 45 to a press 46 or other means for applying a compressive load through the dies or platens 47 to the retort 25a after it has been heated to the brazing temperature. The furnace for obtaining the requisite temperature within the retort may be any conventional type such as an electric or gas fired furnace. Since the furnace and press are both conventional, no necessity exists for their specific description. It is, however, noted that it is desirable to place the furnace and press in close adjacency in order to avoid any unnecessary increases in the time required for transferring the retort from the furnace to its proper position with respect to the platens or dies 47. Furthermore, the furnace is of sufficient capacity to permit heat transference from the furnace to the retort 25a without substantial diminishment in internal temperature. Similarly, the press 46 should have sufficient load capacity to permit the retention of the hot retort 25a between the platens 47 during the cooling cycle without their displacement.

The heating and cooling cycles of our method are thus accomplished by placing the sealed retort on the rollers 44, transporting the retort into the preheated furnace for a sufficient time to assure attainment of a brazing temperature within the retort, removing the retort from the furnace and positioning it upon the lowermost of the platens 47. The upper platen 47 is then lowered into contact with the upper surface of the retort and a sufficient holding force applied thereto to prevent its displacement during the cooling cycle.

The particular brazing temperature to which the retort is heated will, of course, depend not only upon the materials of construction of the cellular core and facing sheets, but also upon the material selected as the brazing or filler metal. The filler metal normally selected for use in conventional honeycomb sandwich panel brazing methods is one which is relatively non-aggressive, one which will effectively and quickly wet the parent metal upon reaching flow temperatures and one which will form good fillets at such temperatures. In addition, the requisite filler metal should satisfy requirements of strength, thermal conductivity, and resistance to corrosion and oxidation. Furthermore, the brazing alloy must be capable of maintaining its shear strength at the high temperatures of intended use of the finished assembly.

A satisfactory filler metal fulfilling the foregoing requirements which has been conventionally used in the past in the fabrication of honeycomb sandwich panels constructed of various types of stainless steel and titanium is one which is composed of 92.3% silver, 7.5% copper, and .2% lithium. This filler metal has a liquidus at approximately 1625° F. and a solidus at approximately 1450° F., it develops satisfactory shear strengths at temperatures as high as 800° F. and will effectively braze two elements constructed of AM350 steel at a temperature of 1600° F. AM350 steel is currently comprised of .09% C, 16.55% Cr, 4.05% Ni, .77% Mn, .20% Si, 2.87% Mo, and .09% N. Where it is desired to braze a pair of elements constructed of 17-7PH and PH15-7 stainless steels, temperatures of 1625° F. and 1675° F. must respectively be used. These are precipitation hardenable stainless steels which are commonly used in high temperature, high strength, environments; the former consisting of .07% C, 17.0% Cr, 7.0% Ni, .40% Si, .012% S, .02% P, .60% Mn and 1.15% Al, and the latter consisting of .07% Ni, 15.0% Cr, 7.00% Ni, .60% Mn, 2.25% Mo, .40% Si, .012% S, .02% P, and 1.15% Al. Insofar as the required quantities of filler materials are concerned we prefer to use filler metal sheets .002 inch in thickness for core heights up to 1.5 inches, while for core heights in excess of this, it will be found desirable to use sheets .003 inch in thickness.

It will be evident that the specific temperature to which the parent metals of the honeycomb panels must be raised will depend not only upon the specific metal of which they are constructed but also upon the nature of the brazing alloy. However, since our invention does not reside in a particular brazing alloy and since the specific temperature at which brazing can be accomplished with different metals and brazing alloys is readily determinable by routine experiment, the temperature to which the retort must be heated in the furnace in order to accomplish formation of an effective bond between the elements of the panel will be referred to as the brazing temperature. This term is intended to mean any temperature at which an effective bond between the cellular core and the surface sheets can be obtained.

After the retort has been raised to the brazing temperature in the furnace 45, it is transferred upon rollers 44 to the lowermost platen 47 where it is positioned to conform to the configuration of this platen. The instant method is applicable to the fabrication of sandwich panels of flat, arcuate, or tapered configuration. In the event that the desired panel is of curved configuration, it will be understood that the cellular core face sheets and the elements of which the retort is constructed will be appropriately formed, prior to heating, in order to avoid the necessity for utilizing the press 46 as a forming machine, although it is possible and, in fact, sometimes desirable to utilize the press to accomplish forming where changes in configuration are slight.

Irrespective of the shape of the desired sandwich panel, the upper platen of the press is lowered into engagement with the upper surface of the retort. The retort 25a is thus maintained or held against displacement by retention means during the cooling cycle.

After the retort has cooled to room temperature, it is removed from engaging relationship with the retaining dies and the brazed honeycomb sandwich panel removed therefrom by cutting the cover sheet internally of the seam or butt welded edge but exteriorly of the cellular core. For the embodiment of FIGURE 3 of the method, wherein the surface or face sheets of the sandwich panel also constitute the cover sheets for the retort, the same procedure is followed as above except that greater care is necessarily taken in removing the edge close-out members.

In the embodiment of our invention relating to the securement of face sheet attachments to the sandwich panel, L-shaped attachment 48, U-shaped attachment 49, T-shaped attachment 50 and angle section attachment 51 are each positioned in the desired relationship with respect to the segments of a face sheet 56. They are retained in this position during the subsequent welding to the face sheet segments 52, 53, 54, and 55 as well as to the face sheet itself, to obtain the configuration illustrated in FIGURE 8. Welding can be accomplished in any desired manner, as by resistance or acetylene welding. The resulting face sheet 56 may be further processed by machining to remove excess weld metal, and if desired, formed along its peripheral edges to converge inwardly towards and abut an oppositely disposed similarly formed face sheet. As shown in FIGURE 9, face sheet 57, which is provided with a T attachment 58 formed integrally therewith is oppositely disposed from a second face sheet 59, which may also be provided with one or more attachments if desired. The cellular core 60 is, of course, placed intermediately between face sheets 57 and 59 and filler metal sheets 61 and 62 placed between the face sheets and the core. The face sheets are welded as at 63 along their peripheral edges and, subsequently, the sealed retort, provided with a purge tube 64, is subjected to the same manipulative steps as those described above with reference to the embodiment of our invention illustrated in FIGURES 3 and 4. These steps comprise substituting an inert gas for the air originally present within the retort, pinching-off the purge tube through which this substitution has been accomplished so as to provide a static atmosphere within the retort, heating to brazing temperatures and then cooling to room temperature while restraining the face sheets against deflection. Since the differential pressure between the outside and inside of the retort urges the face sheet into contact with the cellular core, only the general or total configuration of the retort need be controlled by the restraining means between which the panel is cooled. This embodiment of our invention possesses the advantage that the attachment constitutes an integral part of the face sheet of the panel.

FIGURE 10 illustrates a further modified form of our invention wherein an attachment such as the T section 65 is first welded along its edges to a retort cover sheet 66 after which the elements of the sandwich panel are assembled in the required relationship with the cellular core 67 disposed intermediately between a pair of face sheets 68 and 69, and a pair of filler metal sheets 70 and 71 are placed between the core and each of the face sheets. A separate strip of filler metal 72 is then positioned on the outer surface of the upper face sheet 68 in the position of intended securement of the attachment, and brazing stop-off compound applied to the face sheet and cover sheet in areas adjacent to the strip 72. The filler metal strip 72 is of substantially the same width as the base of the attachment 65 in order to provide for securement of all portions of the base to the face sheet 68. After the retort is sealed by welding the abutting edges of the cover sheet, a static, inert gas atmosphere is provided internally thereof and the retort heated to the brazing temperature and subsequently cooled between a pair of appropriately formed tooling reference planes. In removing the honeycomb sandwich panel from the retort, the cover sheet is cut or machined along the edges 73 and 74 of the insert 65 to separate the attachment from the immediately adjoining sections of the cover sheet 66. Since the brazing alloy strip 72 was of a width sufficient to extend only to the edges of the attachment 65, only the attachment 65 will be secured to face sheet 68, the cover sheet being readily removable from the remainder of the assembly as soon as the cutting or machining operation is completed.

The embodiment of our invention illustrated in FIGURE 11 requires the assembly, in sandwich relationship, of the cellular core 75, filler metal sheets 76 and 77 in abutting adjacency with the core and face sheets 78 and 79 externally thereof. Copper glide sheets 80 and 81 are disposed in contact with the face sheets, and the cover sheets 82 and 83 are assembled externally of the glide sheets. The cover sheets are break-formed at their peripheral edges in order to permit their mutual abutment. One of the cover sheets 82 is provided with a steel purge tube 84 which is welded thereto externally of the intended location of the cellular core 75 and copper glide sheets 80 and 81. A sealed retort is formed by seam welding the abutting edges of the cover sheets as at 85 after which the retort is purged of its existing atmosphere and an inert gas atmosphere at reduced pressure substituted therefor. Upon completion of the purging operation, the purge tube 84 is pinched-off by the application of heat and pressure in the manner described in connection with FIGURE 5. The remaining steps of this embodiment of our invention are similarly identical to those described for the previous embodiment.

The copper glide sheets in this embodiment of our invention perform a dual function. The use of equivalent masses of copper, which has a high thermal conductivity, equalizes heat distribution throughout the panel during the heating and cooling cycles, thus preventing establishment of thermal gradients which are responsible for wrinkling, buckling and distortion of the panel and its face sheets. Furthermore, and of equal importance, is the fact that at the temperatures required for brazing stainless steel, titanium and other high temperature, high strength, corrosion resistant metal sandwhich panels, copper possesses sufficient plasticity to flow into complete contact with all areas of the face sheet surfaces, thus resulting in the application of the differential pressure between the atmosphere and the interior of the retort to all points on the surface of the face sheets. The result is continuous contact of the internal surfaces of the face sheets with the cellular core during the critical period when the brazing alloy itself has sufficient plasticity to flow.

The sandwich panel illustrated in FIGURE 11 is provided with side close-out members 87 and 88 which are Z-shaped in cross-section. These Z close-out members are secured to cellular core 75 during the brazing cycle by including strips of filler metal 89 and 90 between the adjoining segments of the Z close-out members and the cellular core. In addition, spacers 91 are positioned between the base of the Z close-out and the copper glide sheet 80 in order to obviate any tendency of the edges of the panel to buckle.

Although the employment of copper glide sheets in the brazing of relatively simple sandwich panel structures of whatever configuration desired is most advantageous, their use in the brazing of panels having integrally included metal inserts is particularly advantageous. Where the cellular core 75 is provided with a metal insert such as insert 92, the presence of copper glide sheets 80 and 81 will eliminate the existence of thermal gradients during the brazing cycle.

*Examples 1 and 2*

FIGURE 7 summarizes the details of and demonstrates the advantages of our process as contrasted with the conventional sand-seal or double retort method described above. In these examples, a pair of honeycomb sandwich panels designed to be identical in all respects were fabricated by the conventional method and by our method. As indicated in FIGURE 7, each of the panels was 5 feet by 10 feet in size, while the cells were .0015 inch in thickness, ¼ inch in width and ¾ inch in height. Both the cellular core and the face sheets of these panels were constructed of AM350 steel, and the brazing alloy employed was that described above. Each of the panels was heated until it reached 1625° F., the temperature required to accomplish brazing, by placing the complete retort in a luminous wall furnace having a heating capacity of 20,000,000 B.t.u. per hour. As illustrated in the table of FIGURE 7, eight hours were required to bring the honeycomb panel in the sand-seal retort to brazing temperatures, while one-quarter hour was all that was required to achieve brazing temperatures with the retort of our method. Furthermore, the conventional method required utilization of 2640 standard cubic feet of argon while our method required only 26.4 cubic feet of argon.

Insofar as the specific methods employed with respect to the two panels produced in accordance with the methods of Examples 1 and 2 are concerned, the first step of our method involved assembling the cover sheets, face sheets, filler metal sheets, cellular core and edge close-out member in the manner indicated in FIGURE 1. After this, the close-out member and cover member edges were sealed by seam welding in order to form a sealed retort enclosing the sandwich panel elements. The retort was then provided with an inert gas, static atmosphere by initially evacuating the retort to a gage pressure of 29 inches of mercury, introducing argon into the retort until the gage pressure therein reached 2 inches of mercury, and repeating this cycle seven times to insure elimination of all oxidizing gases and moisture. The purge tube, which was 321 steel, ¼ inch diameter by .040 inch wall thickness tubing, was sealed off by applying a compressive force of 152 pounds per square inch to the tube, and locally heating the tube to 1850° F. The retort was then placed in a luminous wall furnace, the temperature of which was 1625° F., and retained therein for a quarter hour. The retort was removed from the furnace and placed between the dies shown in FIGURE 6 and the assembly cooled to room temperature. Finally, the retort was opened by cutting the steel cover sheet interiorly of its seam welded edge, and the honeycomb sandwich panel inspected for deformation, the internal condition of the panel and the type of bond obtained.

The conventional method of Example 1 first required elimination of the impurities normally associated with graphite by cyclically subjecting the machined graphite reference planes to high temperatures in an inert gas, partial pressure environment. The cellular core, brazing alloy sheets and face sheets of the desired sandwich panel were then placed in assembled relationship on one of the graphite reference planes, treated as above, and this assembly then placed in an inner retort base member provided with a pair of purge tubes. The inner retort was covered and sealed by welding the edges of the cover and the sides of the base member and this retort then placed in an outer retort having an annular upstanding trough. The other graphite mass was then rested on the inner retort cover sheet. The depending flanges of the cover of the outer retort was then embedded within the sand contained in the annular trough to enclose the inner retort.

After the inner and outer retorts were closed as above indicated, the purge tubes to the inner retort were respectively connected to an argon source and a vacuum pump, while the single purge tube to the outer retort was connected to the argon gas source. Argon was introduced into the outer retort and continuously flowed therethrough at a sufficient rate to maintain a positive pressure slightly greater than atmospheric within the outer retort, while the inner retort was maintained at a pressure slightly lower than atmospheric pressure by evacuating the retort through the vacuum pump and continuously introducing argon through the other purge tube. The retort and associated tubing were then placed within the same furnace utilized in the performance of our process and retained therein for a period of eight hours, which was the time required to obtain brazing temperatures within the honeycomb sandwich panel. The retort assembly was then removed from the furnace and permitted to cool to room temperature. Argon flowed into the inner and outer retort continuously during the heating and cooling cycles. After the retort assembly had cooled to room temperature, the retorts were opened and the brazed honeycomb sandwich panel removed. The panel was inspected with the aid of ultrasonic and X-ray equipment in order to determine the completeness and continuity of the bond between the cellular core and face sheets. In addition, it was visually compared, for deflection from the desired configuration, with the panel resulting from the practice of our method. It was apparent from these inspections that not only did the panel fabricated in accordance with our method conform more closely to the desired configuration, but also that the core to face sheet bond for our panel was continuous throughout, while several discontinuous areas, where substantially no bond was obtained, existed for the panel fabricated in accordance with the conventional sand-seal method.

Consideration of physical inspection test results, as well as the data contained on the table of FIGURE 7, demonstrated that not only is the panel constructed in accordance with our method possessed of superior physical properties but also that it can be fabricated with a very substantially reduced expenditure of time, labor, material and power.

*Example 3*

In order to further exemplify our process, a cellular core having a thickness of .750 of an inch, a wall thickness of .0015 of an inch and constructed of 17–7PH steel was assembled intermediately between a pair of face sheets of the same material which were 16 inches by 20 inches in size and .020 of an inch in thickness. A pair of sheets of brazing alloy comprised of the silver-copper-lithium alloy identified above were placed between the cellular core and each of the face sheets. The cellular core was 19 inches long by 15 inches wide, thus providing an annular space ½ an inch wide between the edges of the cellular core and the edges of the face sheets so that the channel shaped close-out members, which were .020 of an inch in thickness, .750 of an inch in depth and had flanges ½ an inch wide, could be secured between the face sheets in such annular space. After the close-out members had been sealed to the face sheets by seam welding, the resulting retort was purged by evacuating to a gage pressure of 29 inches of mercury, admitting argon until the gage pressure reached 22 inches of mercury and repeating this cycle five times. The purge tube was then pinched-off by applying a 150 pound compressive force to it and then heating it to a temperature of 1700° F. The tube was ¼ inch in diameter by .040 inch in wall thickness and was constructed of 321 steel. The retort was then placed in a luminous wall furnace pre-heated to a temperature of 1630° F., and retained in the furnace for a total period of six minutes. The hot panel was removed from the furnace and placed between the dies of a press. The transfer time between the furnace and press was twelve seconds while the dwell time between the platens required for reducing the panel to substantially room temperature was four minutes. After the close-out members were severed from the honeycomb panel, it was observed that the panel was flat and that an excellent braze had been obtained in that even filleting of the filler metal existed for both the top and bottom panels and since no evidence existed of any oxidation of the core or the brazing alloy.

*Example 4*

Figure 8:
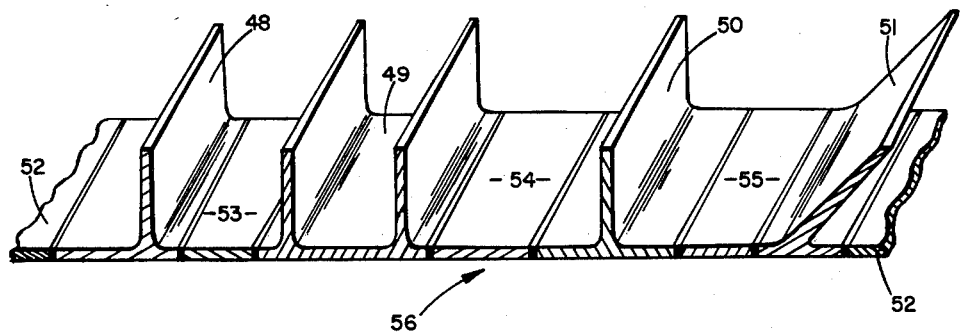
FIGURE 8 is a perspective view of an exemplary face sheet for a sandwich panel assembly in which various attachments have been secured to the sheet.
Figure 9:
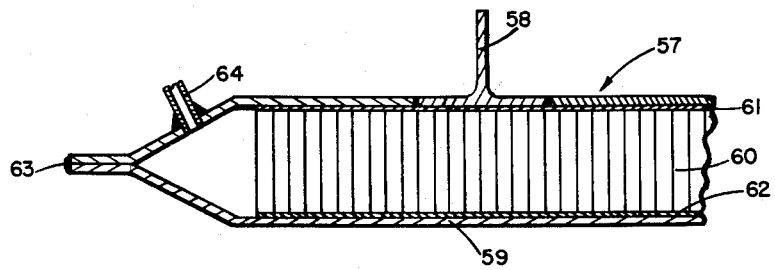
FIGURE 9 is a sectional view of a segment of a retort in which a sandwich panel attachment is secured to a face sheet which forms the cover sheet of a retort.

Exemplary of the method for fabricating the sandwich panel construction of FIGURES 8 and 9, a 17–7PH steel sheet 8 inches by 40 inches was positioned in spaced relationship next to a second sheet of 17–7PH steel of the same size and a T-shaped section of the same metal disposed intermediately therebetween; the edges of the base section thereof lying in adjacency with the opposing edges of said sheets. This T section was 40 inches long by 1 inch in width and had an upstanding flange ⅝ of an inch in height. The material gage was .020 inch for the sheets and .040 inch for the T section. The resulting adjoining edges of base of the T section and the two sheets were then welded together to form a single sheet 17 inches by 40 inches in size. The surfaces of this sheet were then machined to remove excess weld metal and to provide a face sheet having smooth flat surfaces. This face sheet was then disposed on one side of a cellular core of 17–7PH steel having a depth of ¾ of an inch, a cell width of ³⁄₁₆ of an inch and a wall thickness of .0015 inch, while another face sheet of 17–7PH steel having a length of 17 inches, a width of 40 inches and a thickness of .020 inch was placed on the other side of the cellular core. Filler metal sheets of the same length and width as the cellular core were placed between each of the face sheets and the cellular core. The peripherally abutting edges of the face sheets were seam welded and a purge tube ¼ inch in diameter constructed of 321 steel was welded to one of the face sheets in an opening provided therein. The subsequent purging, purge tube pinch-off, heating, cooling and panel removal steps were identical to those set forth in Example 3. The resulting brazed panel conformed to the dimensional requirements of flatness and freedom from face sheet wrinkle. X-ray and ultrasonic examination disclosed a continuous bond between each of the face sheets and the cellular core.

*Example 5*

To exemplify the advantageous results obtaining as a consequence of the utilization of copper glide sheets in the manner illustrated in FIGURE 11, a panel constructed in the same manner as the panel of Example 3 was fabricated in accordance with the manipulative steps recited in that example except for the below indicated variations. These variations included the provision of the cellular core with a rectangular 17–7PH steel plate having a thickness of .750 of an inch, a length of 5 inches and a width of 3 inches. The cellular core was cut to provide a rectangular opening 3 inches by 5 inches for reception of the rectangular plate. The cutout portion had its long side extending parallel to the long edge of the cellular core and was spaced 5 inches away from this edge while the shorter side of the cutout was spaced 12 inches from the adjacent edge of the cellular core. Copper glide sheets ⅛ of an inch in thickness and 15 inches by 45 inches in length and width were disposed in contacting relationship with the face sheets of the panel prior to enclosing the assembled panel within the retort. After brazing this assembly, visual inspection, X-ray and ultrasonic examination demonstrated that the panel contained on wrinkled, buckled or distorted areas, nor was there any discontinuity of bond between the panel face sheets and the core.

While our invention has been fully described and illustrated, it will be understood that this disclosure is for purposes of exemplification and is not to be taken by way of limitation, the spirit and scope of our invention being limited only by the terms of the accompanying claims.

We claim:
1. A method for fabricating a metal honeycomb sandwich panel which comprises:
 (1) Assembling a honeycomb cellular core in sandwich panel relationship with a pair of face sheets and providing brazing alloy between said face sheets and said core to form a sandwich panel assembly;
 (2) Disposing a copper glide sheet on either side of said sandwich panel assembly in contact with each of said face sheets;
 (3) Enclosing said sandwich panel assembly and said copper glide sheets within a retort having a pair of opposed cover sheets, said copper glide sheets being intermediately adjacent to and contacting the surfaces of said face sheets and said cover sheets and deforming plastically at brazing temperature to flow into substantially complete contact with all portions of the face sheet surfaces to insure substantially uniform pressure application to said face sheets and substantially complete contact of the internal surfaces of said face sheets with the cellular core;
 (4) Removing oxidizing gases and moisture from said retort and reducing the internal pressure therein to below atmospheric pressure;
 (5) Sealing the interior of said retort from the atmosphere;
 (6) Heating said retort to brazing temperature and plastically deforming said copper glide sheets;
 (7) Cooling said retort to room temperature;
 (8) Continuously restraining said retort against deformation during said cooling, and
 (9) Removing said sandwich panel assembly from said retort.

2. A method for fabricating a metal honeycomb sandwich panel having a pair of face sheets and a cellular core intermediately disposed therebetween and secured thereto which comprises:
 (1) assembling said face sheets and said cellular core in sandwich relationship and providing brazing alloy between said face sheets and said core to form a sandwich panel assembly;
 (2) Placing said assembly between a pair of copper glide sheets and enclosing said assembly and abutting copper glide sheets within a retort having a purge tube, said retort having a pair of opposed cover sheets and said assembly being enclosed within said retort so that said copper glide sheets are disposed between and contact both the face sheets of said panel and the cover sheets of said retort, said copper glide sheets deforming plastically at brazing temperature to flow into substantially complete contact with all portions of the face sheet surfaces to insure substantially uniform pressure application to said face sheets and substantially complete contact of the internal surfaces of said face sheets with the cellular core;
 (3) Purging said retort with and substituting an inert gas atmosphere, at a pressure less than atmospheric pressure, for the gases originally present therewithin;
 (4) Sealing-off said purge tube to establish a static, inert gas atmosphere within said retort;
 (5) Immersing said retort in a heat bath having a temperature at least equal to the brazing temperature of said assembly and retaining said retort in said heat bath until said assembly reaches brazing temperature and said copper glide sheets plastically deform;
 (6) Removing said retort from said heat bath and placing it between a pair of restraining platens;
 (7) Cooling said retort while retaining it between said platens, and
 (8) Removing said assembly from said retort.

3. The method for fabricating a metal honeycomb sandwich panel of claim 2 which further comprises providing said cellular core with a cutout portion and disposing a metal insert within said cutout portion prior to assembly of said cellular core and said face sheets.

4. The method for fabricating a metal honeycomb sandwich panel of claim 2 wherein the purging of said retort comprises cyclically evacuating and then filling said retort with an inert gas with at least five such evacuation and filling cycles.

5. The method for fabricating a metal honeycomb sandwich panel of claim 2 in which said purge tube is sealed off by applying a local compressive load diametrically thereto, said compressive load being less than the yield strength of the metal of said tube at room temperature while being at least equal to the yield strength of said metal at 1700° F. but less than the ultimate tensile strength of said metal at 1700° F., and heating said tube to 1700° F. in the area of application of said load.

6. The method for fabricating a metal honeycomb sandwich panel of claim 2 in which said assembled panel is enclosed within said retort by welding together the edges of said cover sheets externally of said cellular core.

(References on following page)

References Cited in the file of this patent

UNITED STATES PATENTS

| | | | |
|---|---|---|---|
| 1,247,250 | Field | Nov. 20, | 1917 |
| 1,764,271 | Leonard | June 17, | 1930 |
| 2,056,398 | Herzog | Oct. 6, | 1936 |
| 2,057,969 | Payson et al. | Oct. 20, | 1936 |
| 2,473,887 | Jennings et al. | June 21, | 1949 |
| 2,700,632 | Ackerlind | Jan. 15, | 1955 |
| 2,704,587 | Pajak | Mar. 22, | 1955 |
| 2,713,196 | Brown | July 19, | 1955 |
| 2,720,948 | Pajak | Oct. 18, | 1955 |
| 2,722,735 | Beamish | Nov. 8, | 1955 |
| 2,813,332 | Keay | Nov. 19, | 1957 |
| 2,820,286 | Andrus | Jan. 21, | 1958 |
| 2,820,751 | Saller | Jan. 21, | 1958 |
| 2,824,364 | Bovenkerk | Feb. 25, | 1958 |
| 2,944,339 | Sandberg | July 12, | 1960 |
| 2,984,732 | Herbert | May 16, | 1962 |
| 3,066,393 | Malagari | Dec. 4, | 1962 |
| 3,068,565 | King et al. | Dec. 18, | 1962 |
| 3,071,853 | Price et al. | Jan. 8, | 1963 |
| 3,073,268 | Cole | Jan. 15, | 1963 |

FOREIGN PATENTS

| | | | |
|---|---|---|---|
| 490,586 | Great Britain | Aug. 17, | 1938 |
| 1,162,692 | France | Sept. 16, | 1958 |